United States Patent [19]

Mohr et al.

[11] 4,326,434

[45] Apr. 27, 1982

[54] PROCESS FOR UNDERLAYING A FLAT-BED STEEL RULE DIE

[75] Inventors: Heinz Mohr, Speyer; Walter Hoffmann, Frankenthal; Rudolf Vyvial, Ludwigshafen, all of Fed. Rep. of Germany

[73] Assignee: BASF Aktiengesellschaft, Ludwigshafen, Fed. Rep. of Germany

[21] Appl. No.: 132,984

[22] Filed: Mar. 24, 1980

[30] Foreign Application Priority Data

Apr. 2, 1979 [DE] Fed. Rep. of Germany ....... 2913178

[51] Int. Cl.$^3$ ................................................ B21K 5/20
[52] U.S. Cl. .................................. 76/107 C; 493/372
[58] Field of Search .................. 76/107 C, 107 R; 83/669, 684, 691; 493/372, 61, 73, 62, 74, 242

[56] References Cited

U.S. PATENT DOCUMENTS

| | | | |
|---|---|---|---|
| 348,548 | 9/1886 | Crump | 76/107 C |
| 2,993,421 | 7/1961 | Phillips | 76/107 C |
| 3,170,358 | 2/1965 | Martin | 76/107 C |
| 3,302,490 | 2/1967 | Bishop | 76/107 C |

OTHER PUBLICATIONS

BASF–Customers Technical Leaflet, Operating Instructions Nyloprint Counterforme–Makeready for Cutting and Creasing Dies, pp. 1–6.

*Primary Examiner*—Roscoe V. Parker
*Attorney, Agent, or Firm*—Keil & Witherspoon

[57] ABSTRACT

A process for underlaying flat-bed steel rule dies prior to producing sheet-like geometrical cut blanks, preferably from multi-blank sheets, in which varying tolerances, in the punching and cutting direction, of the steel rule cutters held in a rigid plate are compensated by a sheet, corresponding to the area of the sheet being cut, placed on the back of the steel rule cutter plate and consisting of a flowable hardenable plastic, the upper and lower platen being moved together so as to close the die and the sheet of plastic, bearing the relief formed thereon, then being solidified by an after-treatment.

7 Claims, 1 Drawing Figure

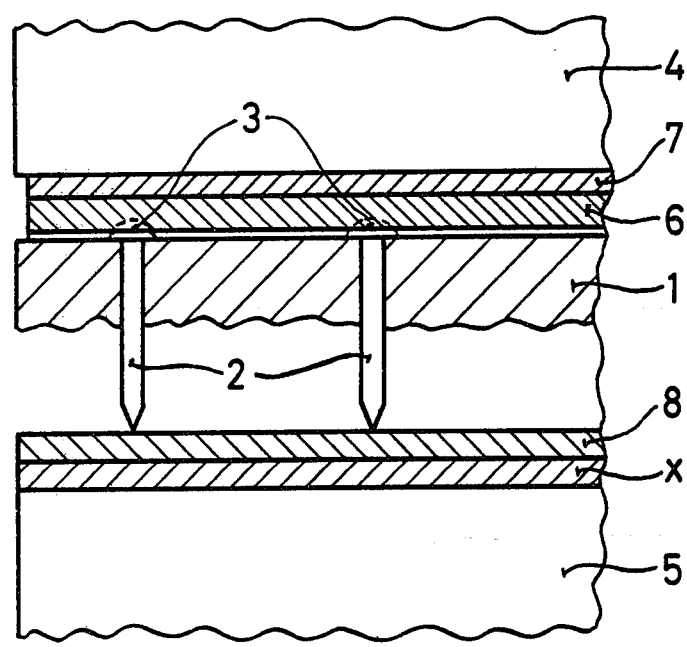

PROCESS FOR UNDERLAYING A FLAT-BED STEEL RULE DIE

The present invention relates to processes for die-cutting sheets of cardboard, paper and soft metals in accordance with predetermined geometrical shapes, in particular for the manufacture of folding boxes and similar cuboid containers for preferably automated packaging lines, and measures and means for setting the steel rules to produce dimensionally very precise, and non-frayed, cuts.

It has been disclosed that in place of an underlay cut or milled in the cardboard or plastic sheet, an underlay of photopolymer sheets, obtained more economically by film assembly, may be employed for slotting and cutting dies in flat-bed automatic cutting and creasing machines. The underlay is a plate which cooperates directly in the production of cuts and creases and is marked "X" in the drawing; it bears a system of ridges or grooves which, for example, correspond to the geometry of the folds of a folding box. However, the strictly geometrical relief, in the form of a system of ridges or grooves, is not produced by conventional processes, which are mostly machining processes, but by the known process for the manufacture of relief printing plates by photopolymerization. Such plates, hardened by photopolymerization, and used as an underlay, are, for this purpose, applied to a stainless steel sheet.

However, the cutting and creasing for the production of folding boxes and similar geometrical blanks also requires underlays of a different type, for example in order to compensate for dimensional variations in the steel rules in the cutting direction and to compensate for different force fluxes of the cutting pressure in the plane, resulting, for example, from a geometrically unequal distribution of the cuts and creases over the entire surface. Such underlays are applied as thin gummed strips to the back of the cutter plate, ie. to the base of the cutters, whilst repeatedly testing the cutting pressure of the steel rule cutters, which are fixedly inserted in the plate. On repeated test application of the cutting pressure to the steel rule die which is being underlaid, a sheet (of cardboard or the like) for cutting must also be provided in each case, and this is then of no further use. This underlaying process with glued-on underlaying strips is extremely labor-intensive and cost-intensive. However, hitherto it has not been possible to obtain precise creases and cuts, and non-frayed cut edges, of the blanks by any other method.

We have found that the underlaying of the steel rule dies, ie. the compensation of inaccuracies on the back of the steel rule cutter plate, can be substantially speeded up, simplified and made cheaper if, according to the invention, a sheet, bonded to a dimensionally stable base, of a flowable plastic or corresponding plastic intermediate, which can be hardened at below 100° C. to give a hard crosslinked plastic, the sheet having a preselected thickness and corresponding in size to the total area of the sheet from which the blanks are to be cut, is applied to the back of the steel rule cutter plate, the upper and lower platen of the punch or press are then moved together, with the steel rule cutter plate between them and are opened again, and the plate, bearing the relief produced thereon or therein, is then solidified by an after-treatment.

To restrict the flow of the plastic sheet when closing the punch or press in order to form the compensating relief, a plastic sheet of a predetermined hardness, but still in a flowable state, laminated onto a metal base, is particularly useful.

The sheets bonded to a dimensionally stable base, especially a steel sheet or aluminum sheet, consist of plastics or plastic intermediates which at room temperature are solid or waxy, but flowable, and can be hardened at below 100° C., especially at from 10° to 50° C., to give hard, crosslinked plastics. The non-hardened sheets or coatings should preferably be irreversibly, or substantially irreversibly, deformable by embossing at room temperature, and the coatings bearing the relief embossing should be capable of hardening, without noticeable or substantial change in the relief shape, to give hard, crosslinked materials which in particular have a modulus of elasticity of not less than 100,000 kp/cm$^2$ (in general from 100,000 to 300,000 kp/cm$^2$) and preferably of at least 150,000 kp/cm$^2$.

Suitable plastics and plastic intermediates are the conventional polymers, monomers and oligomers, with or without addition of crosslinking agents, which lead to resins, crosslinked polymers, polycondensates and polyadducts; the nature of these is described in Houben-Weyl, Methoden der organischen Chemie, Stuttgart 1963, Volume 14/2, and a suitable form of product can be selected by an expert. Examples include unsaturated polyester resins, polyesters, polyurethane intermediates, crosslinkable nylons and nylon mixtures, curable epoxy resins, melamine resins or phenolic resins, provided they have sufficient flow, in the non-hardened state, that they can be embossed with the desired relief and retain the relief shape, substantially accurately, when being hardened to give hard crosslinked plastics. Of course the coatings can, in addition to plastics or plastic intermediates, contain conventional additives such as fillers, pigments, initiators, hardeners, inhibitors and/or plasticizers, provided these do not influence the flow, dimensional stability or hardness in a manner unsuitable for the process according to the invention.

Sheet materials which can be hardened or photopolymerized through crosslinking by exposure to high energy radiation have proved particularly suitable for the underlaying process according to the invention. These especially include photocrosslinkable plastics and/or photopolymerizable olefinically unsaturated compounds, such as the conventional photopolymerizable mixtures and recording compositions which are used for the manufacture of plastic printing plates and relief forms, provided they possess the properties specified above in respect of flow, deformation, hardening and hardness of the crosslinked products. Such materials and their crosslinking are described, for example, in German Laid-Open Application DOS No. 2,040,390, French Pat. No. 1,520,856, German Laid-Open Application DOS No. 2,114,767 and German Published Application DAS No. 1,128,220. Photopolymerizable mixtures based on water-soluble vinyl alcohol polymers or their reaction products, for example with 1,2-alkylene oxides, eg. ethylene oxide, and photopolymerizable monomers such as acrylates and methacrylates, eg. hydroxyethyl acrylate or methacrylate or polyacrylates or polymethacrylates of polyols, eg. triethylene or tetraethylene glycol diacrylate or dimethacrylate, have proved particularly suitable.

The drawing illustrates the underlaying of a steel rule cutter plate by the process according to the invention, using a flowable plastic sheet, capable of forming a relief, in conjunction with the upper and lower platen of a punch or press. The steel rule cutter plate, preferably made of plywood, is marked 1 and the cutters 2 to be employed for cutting, perforating or embossing (creasing) are fixedly fitted in the plate in a conventional manner. In the ideal case, the bases 3 of the cutters should be flush with the plane of the cutter plate. After standardization, the height of the steel rule cutters is, for example, 23.8 mm but due to the method of manufacture and the sharpening or shaping of the cutter edges, there is a variation from about 23.8 to 23.78 mm, ie. of about 20 $\mu$m. This has conventionally been progressively compensated by strips of paper to be glued onto the back of the steel rule cutter plate. The procedure used conventionally was to move the upper platen 4 repeatedly toward the lower platen 5 of the punch, with the steel rule cutter plate between the platens, and test the correctness of the cut or of the embossing (creasing) on a sheet of cardboard or the like, inserted as a test sample. In some cases, the application of further glued strips to compensate for tolerances had to be repeated many times.

According to the invention, a thin flowable plastic sheet 6, laminated to a solid metal base 7, is, instead, placed on the back of the steel rule cutter plate 1 and, to compensate for tolerances, the upper platen 4 is moved towards the lower platen 5 of the punch. This produces a relief, corresponding to the tolerances, in the flowable layer 6, especially in the region of the bases 3 of the cutters. After moving the platens, with the plate 1 and sheets 6 and 7 interposed, together once only, the initially flowable coating of the underlay sheet 6 is hardened as described above, and thus provides perfect compensation of the tolerances of the steel rule cutters 2, whilst substantially shortening the time normally required for underlaying. In the drawing, 8 is the sheet (of cardboard or the like) lying in front of the cutters 2, which is to be severed, by cutting, perforating and embossing, into a plurality of folding box blanks.

EXAMPLE

A steel base plate 0.2 mm thick was coated with a solution of 100 parts of a partially hydrolyzed polyvinyl acetate (degree of hydrolysis 82 mole %; mean degree of polymerization 500), 100 parts of an oxyethylated partially hydrolyzed polyvinyl acetate (molecular weight 30–35,000; 24% content of ethylene oxide units), 150 parts of hydroxypropyl acrylate and 5 parts of benzoin isopropyl ether in 200 parts of water.

After drying the coating for 16 hours at room temperature, a laminate of 0.31 mm total thickness was obtained. Before exposure, the plastic layer had a modulus of elasticity of 2,000–5,000 kp/cm$^2$ and could easily be plastically molded in an irreversible manner. As a result of hardening in a fluorescent tube exposure apparatus, the modulus of elasticity increased to 160,000 kp/cm$^2$, and as a result the plastic coating offers sufficient resistance to the loads developed at the cutters during the cutting and creasing process.

Using such plates, it proved possible to produce 150,000 perfectly cut box blanks from cardboard, without any manual underlaying, and without damage to the cutters.

We claim:

1. A process for underlaying flat-bed steel rule dies of a punch or press having upper and lower platens prior to the production of sheet-like geometrical cut blanks, for example, for folding boxes and similar cuboid containers consisting of paper, cardboard or soft metals, preferably where multi-blank sheets are concerned, so as to compensate for the varying tolerances of the steel-rule cutters in the punching and cutting direction and the different force fluxes of the punching pressure in the cutters plate fitted with the steel rule cutters, said process comprising:

applying to the back of the steel-rule cutter plate, a sheet bonded to a dimensionally stable base, of a flowable plastic, which can be hardened at below 100° C. to give a hard crosslinked plastic, the sheet having a preselected thickness and corresponding in size to the total area of the sheet from which the blanks are to be cut;

then moving the upper and lower platens of the punch or press together, with the steel-rule cutter plate between them so as to emboss a relief on said sheet of flowable plastic;

opening the platens again;

then solidifying the sheet bearing the relief formed therein, by an after treatment outside of the press; and replacing the sheet between the back of the steel-rule cutter plate and the corresponding platen of the press.

2. A process as claimed in claim 1, wherein the time required for embossing the relief in the flowable plastic sheet depends on the thickness of the sheet and on the closing pressure of the platens.

3. A process as claimed in claim 1, wherein a sheet, from 60 to 300 $\mu$m thick, of a flowable plastic, laminated onto a metal base, is used, this sheet being subjected to pressures of from 40 to 120 kp/cm$^2$ to form the relief and thereby undergoing plastic deformation corresponding to the tolerances.

4. A process as claimed in claim 1, wherein a sheet which is substantially irreversibly deformable by embossing at room temperature is used.

5. A process as claimed in claim 1, wherein the sheet material bearing the embossed relief is hardened, without substantial change of the shape of the relief, at below 100° C. to give a hard crosslinked plastic having a modulus of elasticity of not less than 100,000 kp/cm$^2$.

6. A process as claimed in claim 1, wherein the sheet material is hardened by exposure to high energy radiation.

7. A process as claimed in claim 6, wherein the sheet, bonded to a dimensionally stable base, contains a photocrosslinkable plastic and/or photopolymerizable olefinically unsaturated compounds.

* * * * *